July 22, 1958

H. J. GERBER 2,843,935

INSTRUMENT FOR MEASURING, INTERPOLATING, PLOTTING AND THE LIKE

Filed Nov. 23, 1953

INVENTOR
HEINZ JOSEPH GERBER
BY
ATTORNEY

July 22, 1958   H. J. GERBER   2,843,935
INSTRUMENT FOR MEASURING, INTERPOLATING, PLOTTING AND THE LIKE
Filed Nov. 23, 1953   5 Sheets-Sheet 2

INVENTOR
HEINZ JOSEPH GERBER
BY S. Jay Teller
ATTORNEY

July 22, 1958  H. J. GERBER  2,843,935
INSTRUMENT FOR MEASURING, INTERPOLATING, PLOTTING AND THE LIKE
Filed Nov. 23, 1953  5 Sheets-Sheet 3
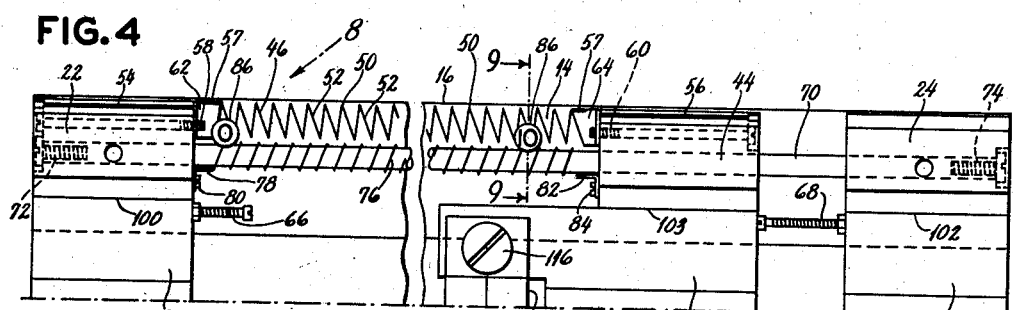
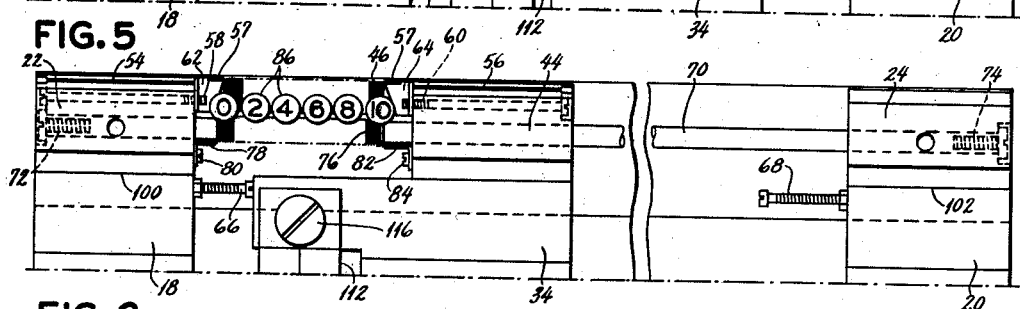
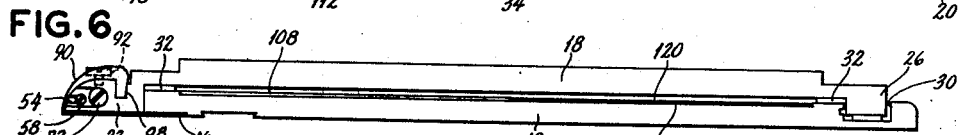
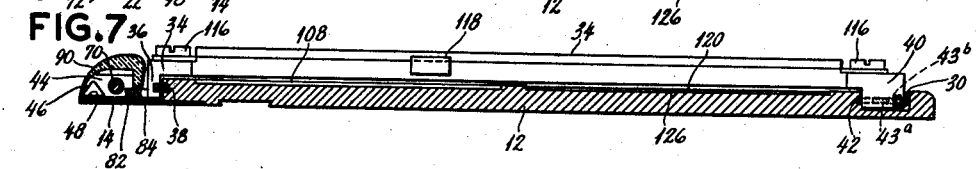
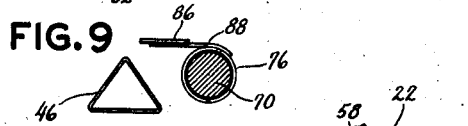
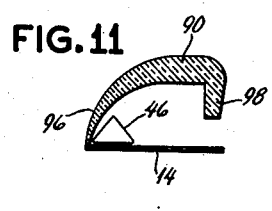
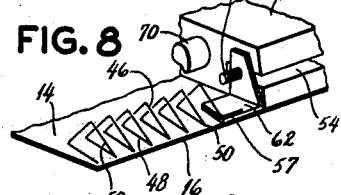
INVENTOR
HEINZ JOSEPH GERBER
BY *X. Jay Teller*
ATTORNEY July 22, 1958  H. J. GERBER  2,843,935
INSTRUMENT FOR MEASURING, INTERPOLATING, PLOTTING AND THE LIKE
Filed Nov. 23, 1953  5 Sheets-Sheet 4
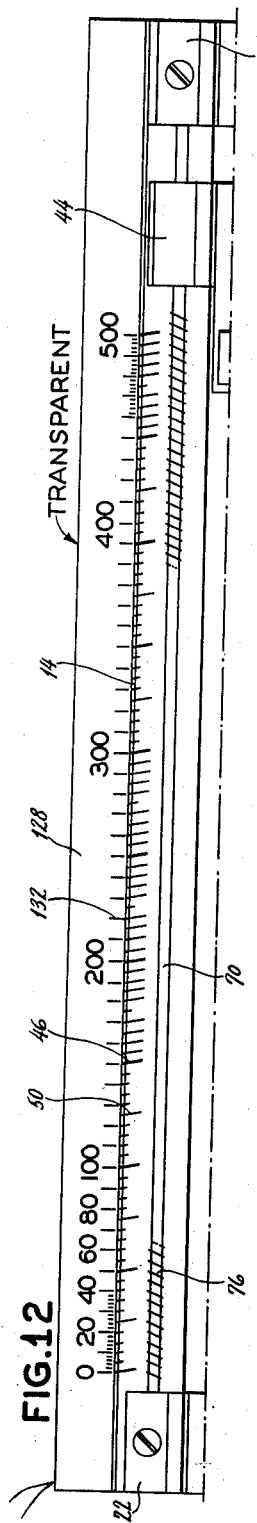
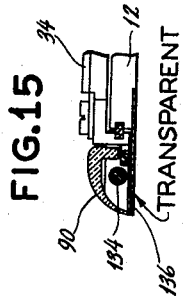
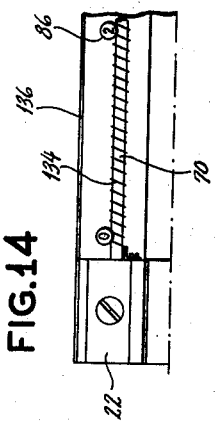
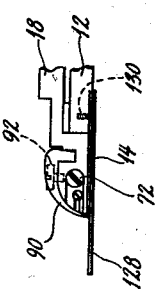
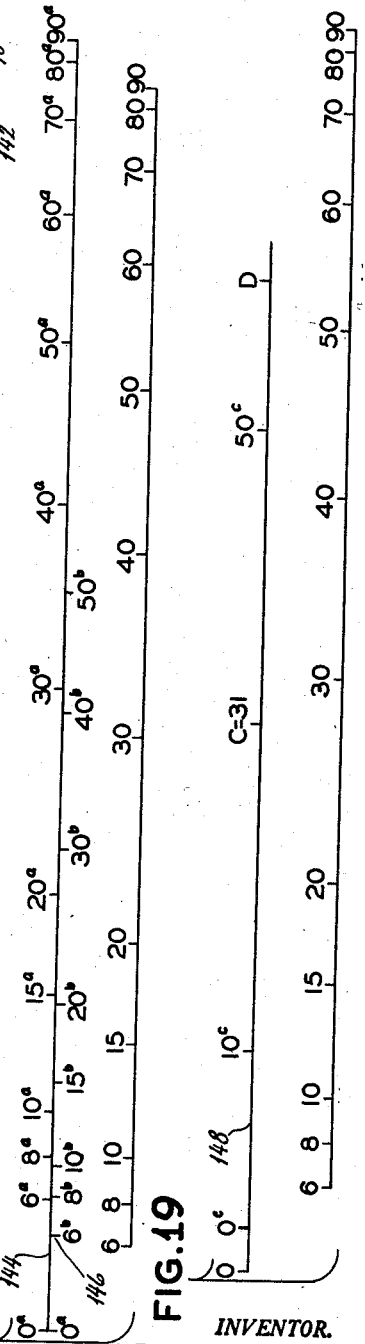
INVENTOR.
HEINZ JOSEPH GERBER
BY
ATTORNEY July 22, 1958          H. J. GERBER          2,843,935

INSTRUMENT FOR MEASURING, INTERPOLATING, PLOTTING AND THE LIKE

Filed Nov. 23, 1953          5 Sheets-Sheet 5

*INVENTOR.*
*HEINZ JOSEPH GERBER*

BY

*ATTORNEY*

2,843,935
INSTRUMENT FOR MEASURING, INTERPOLATING, PLOTTING AND THE LIKE

Heinz Joseph Gerber, Hartford, Conn., assignor to The Gerber Scientific Instrument Company, Hartford, Conn., a corporation of Connecticut Application November 23, 1953, Serial No. 393,545

20 Claims. (Cl. 33—1)

The present invention relates to an instrument of the general type shown in my patents Nos. 2,561,020 and 2,530,955. An instrument of this type is particularly characterized by an extensible spring so formed and so related to other parts that its convolutions or points thereon constitute graduations having variable spacings.

One object of the invention is to provide an instrument of the type specified having an improved detachable cover for the extensible spring.

A further object of the invention is to provide an instrument of the type specified wherein the cover for the spring is so formed and positioned as to provide apparent positions for the spring graduations which are spaced forwardly from their actual positions.

A further object of the invention is to provide an instrument of the type described wherein the spring is a part of a readily detachable unit having improved features and characteristics.

A still further object of the invention is to provide an instrument of the class described having improved means for mounting an auxiliary spring for identifying the markings on the graduated spring.

A still further object of the invention is to provide an instrument of the type described having a variety of longitudinally extending scales on the base thereof and particularly related to the graduated spring for use in conjunction therewith.

Another object of the invention is to provide an instrument of the class described having a plurality of longitudinally extending scales having an advantageous mechanical relationship with other parts of the instrument.

Still another object of the invention is to provide an instrument of the type described having a graph sheet upon which points or graphs can be plotted for use in conjunction with the graduated spring.

Still another object of the invention is to provide an instrument of the class described having a scale directly adjacent the extensible spring.

Still another object of the invention is to provide an instrument having a spring serving as an extensible scale and having designating tabs carried directly by some of its convolutions.

Still other objects of the invention will be apparent from the drawings and from the following description.

In the drawings I have shown in detail three embodiments of the invention, but it will be understood that various changes may be made from the constructions shown, and that the drawings are not to be construed as defining or limiting the scope of the invention, the claims forming a part of this specification being relied upon for that purpose.

Of the drawings:

Fig. 4 is a fragmentary plan view on an enlarged scale of the upper portion of the instrument as shown in Fig. 1 with the top front cover omitted.

Fig. 5 is a fragmentary plan view generally similar to Fig. 4 but showing some of the parts in different positions.

Fig. 6 is a left end view of the instrument.

Fig. 7 is a transverse sectional view taken along the line 7—7 of Fig. 1, with certain parts omitted.

Fig. 8 is a fragmentary perspective view taken in the general direction of the arrow 8 in Fig. 4.

Fig. 9 is a fragmentary enlarged transverse sectional view taken approximately along the line 9—9 of Fig. 4.

Fig. 10 is a schematic plan view showing only the extensible spring and showing an alternative pattern of graduation marking on the spring convolutions.

Fig. 11 is an enlarged fragmentary view similar to the left portion of Fig. 7.

Fig. 12 is a fragmentary view similar to Fig. 1 but showing an alternative embodiment of the invention.

Fig. 13 is a fragmentary end view similar to Fig. 6 but showing the said alternative embodiment of the invention.

Fig. 14 is a fragmentary view similar to the upper left portion of Fig. 1, but showing an alternative embodiment of the invention.

Fig. 15 is a fragmentary sectional view similar to Fig. 7, but showing the alternative embodiment of the invention as illustrated in Fig. 14.

Fig. 16 is a view similar to the right portion of Fig. 9, and showing an alternative detail particularly useful with the embodiment of the invention shown in Figs. 14 and 15.

Fig. 17 is a fragmentary plan view of an alternative detail of construction particularly useful with the embodiment of the invention shown in Figs. 14 and 15.

Fig. 18 is a diagram for explaining the use of the instrument with utilization of the scales shown in Figs. 1 and 2.

Fig. 19 is another diagram for explaining the use of the instrument with utilization of the scales as shown in Figs. 1 and 2.

Figure 1:
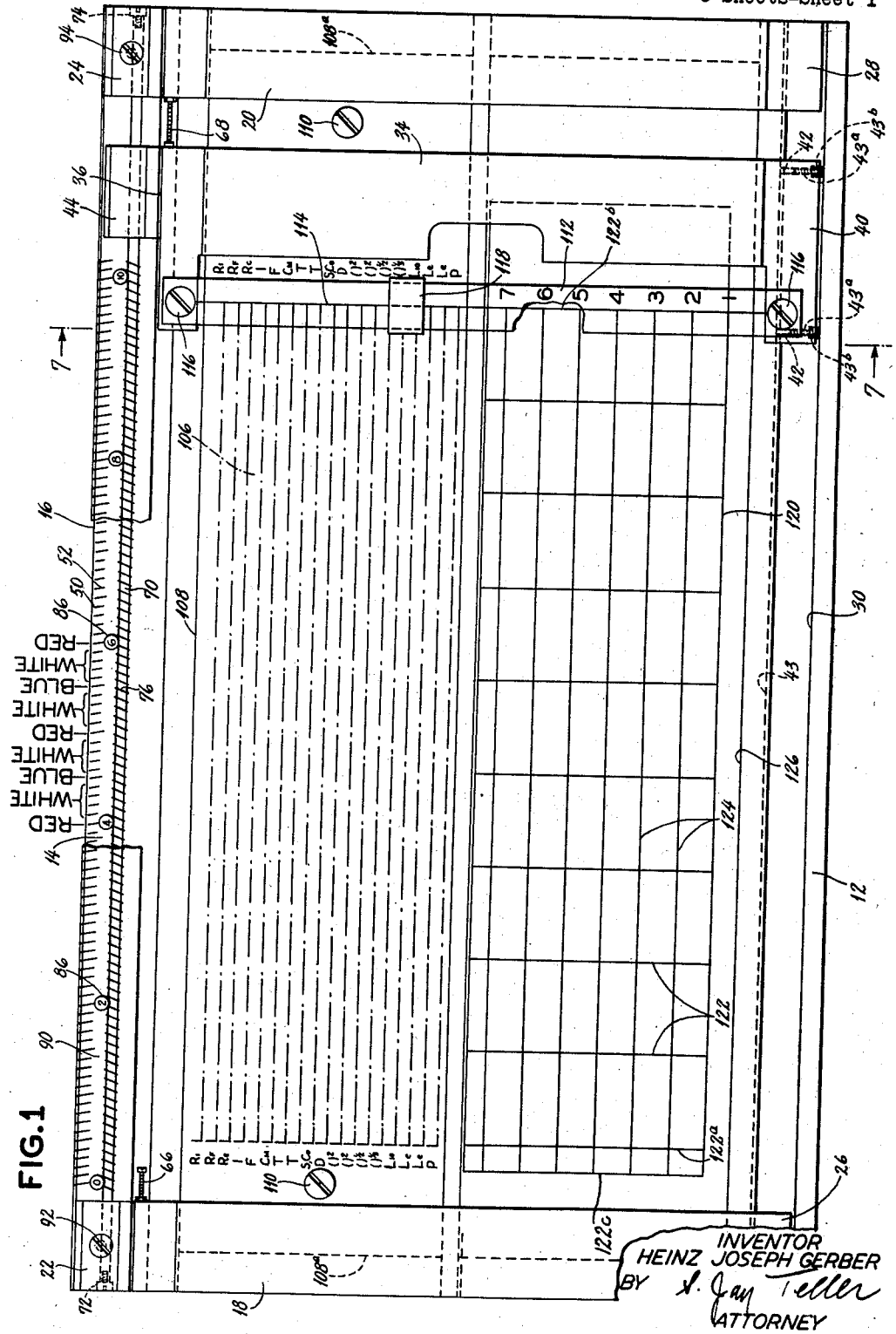
Fig. 1 is a plan view of an instrument embodying the invention, with certain parts indicated schematically.

Instrument as shown in Figs. 1 to 11

An instrument embodying the present invention is in many respects generally similar to those shown in my said Patents Nos. 2,561,020 and 2,530,955. It comprises a longitudinal main base, a slide longitudinally movable along the base, and an extensible longitudinal spring connected at one end with the base and at the other end with the slide so that its total length can be varied by movement of the slide along the base. Portions of the convolutions of the spring constitute graduations for measuring, for plotting and for other purposes.

Referring to the drawings and more particularly to Figs. 1, 4, 5, 6 and 7 thereof, 12 is a longitudinal base member which is essentially a flat plate but which is provided with certain recesses and grooves as hereinafter pointed out. Rigidly secured to the base member 12 at the front of the bottom portion thereof is a thin flat plate 14, the plate extending forwardly beyond the base member to a substantial extent. The plate 14 has a straight longitudinal front edge 16. The base member 12 is recessed at the bottom to receive the plate 14 so that the bottom of the plate and the bottom of the base member are in the same plane.

Rigidly secured to the base member 12 and at least indirectly to the plate 14 at the left and right ends thereof are two transverse members 18 and 20. The shape of the member 18 is clearly shown in Fig. 6 and the member 20 is similarly shaped. At their front ends the members 18 and 20 have downwardly offset forward projections 22 and 24 which engage the thin plate 14 and which have front faces adjacent the front edge of the said plate. At their rear ends the said members 18 and 20 have depending portions 26 and 28 which enter a longitudinal recess 30 in the base member 12. Preferably the main bodies of the members 18 and 20 are slightly spaced upwardly from the top of the base member 12 by means of spacers 32, 32. The base member 12, the plate 14 and the members 18 and 20 collectively constitute the base of the instrument.

A slide 34 is provided at the front of the base and it is connected therewith for longitudinal movement. The base member is formed to provide a longitudinal guideway for the slide, the said guideway having widely spaced portions one of which is near the front and the other of which is near the rear. The slide has a depending portion 36 which is at the front of the base member 12 and which extends to or nearly to the thin plate 14. The portion 36 of the slide has a longitudinal guide 38 which enters and fits a longitudinal groove in the front of the base member 12, the grooved portion of the base member constituting the forward portion of the guideway. The slide also has a depending portion 40 at the rear thereof which is within the said longitudinal recess 30 in the base member 12. The portion 40 of the slide has one or more guide elements 42 which are entered at their forward ends in a longitudinal groove 43 in the base member 12 and in the front wall of the recess 30. Each guide element 42 is preferably a plug movable in a transverse hole in the slide and pressed by a spring 43ᵃ which abuts against a screw 43ᵇ. The last said grooved portion of the base member constitutes the rearward portion of the guideway. The guide 38 and the guide elements 42 respectively engage the front and rearward portions of the guideway on the base member to guide the slide for rectilinear movement along the base.

The slide 34 has a forward projection 44 which is preferably integral with the depending portion 36. The projection 44 has its bottom face closely adjacent the top face of the plate 14 and its front face is near the front edge 16 of the said plate.

The before-mentioned extensible spring is shown at 46 and it is preferably of the type more particularly disclosed in the said Patent No. 2,530,955. The left end of the spring 46, as viewed in Fig. 1, is connected with the base and the right end of the spring is connected with the projection 44 of the slide 34, the details of connection being hereinafter more fully described. The spring 46 is a coil spring having its convolutions uniformly spaced longitudinally, the spacings between all of the convolutions being uniformly varied when the length of the spring is varied by movement of the slide. I prefer to provide a spring having its convolutions generally triangular in shape. The space at the front of the base member 12 and above the thin plate 14 constitutes an open-sided longitudinal recess in the base for the spring 46, this recess extending between the projections 22 and 24 on the base members 18 and 20. The spring is preferably so located in the said recess that the straight or substantially straight portions 48 of the convolutions are horizontal and are in close proximity with the top of the plate 14. As best shown in Fig. 8, the convolutions of the spring are relatively sharply bent and the spring therefore has longitudinally aligned relatively sharp corner portions 50, 50 which are at the bottom thereof and at the front thereof. These corner portions 50, 50 constitute graduations particularly in conjunction with the adjacent inclined convolution portions 52, 52.

It will be seen that the upper front portions 52, 52 of the convolutions of the spring 46 are inclined upwardly and rearwardly from the said corner portions 50, 50. This upward and rearward inclination facilitates observation of the graduations, particularly when viewed from the top. The spring is so located that the graduations 50, 50 are immediately adjacent the front edge 16 of the plate 14 and the spring may be so located that the said graduations are spaced rearwardly to a very small extent from the said edge 16.

In order that the spring 46 may be accurate for various degrees of extension, it is desirable or essential that after winding it be heated to a relieving temperature such that variations in strain due to the winding of the spring are diminished. The relieving temperature may range from 350° F. to 900° F. depending upon time.

The spring 46 may be variously connected with the base and the slide, but it is preferably so connected by means such as that best shown in Fig. 8, this figure showing the connection to the base. The base projection 22 and the slide projection 44 have longitudinal grooves 54 and 56 in the front faces thereof and open at the front. The base projection 22 has a vertical transverse wall facing toward the slide projection 44 and the said slide projection has a similar vertical transverse wall facing toward the base projection. Longitudinal screws 58 and 60 are located in the grooves 54, 56. A spring unit is provided which includes the spring 46 and which also includes angle bracket 62 and 64. The horizontal leg of each bracket is connected by soldering or otherwise at 57 to a longitudinal end portion of the wire of the spring at the corresponding end thereof and the vertical leg of each bracket engages the corresponding vertical transverse wall on the projection 22 or 44, being engaged and held in place by the corresponding screw 58 or 60. The horizontal legs of the brackets are in register with each other and engage the top of the thin plate 14 of the base and to properly locate the brackets and the spring and to prevent rotative movement thereof. When the screws are tightened, the brackets are clamped to the projections 22 and 44 on the base and on the slide.

It will be observed that the spring unit including the spring 46 and the brackets 62 and 64 is readily attachable and detachable without detaching or removing any other parts except the hereinafter described spring cover. The unit is movable rearwardly for attachment and forwardly for detachment, the screws 58 and 60 ordinarily being loosened and moving rearwardly or forwardly with the brackets. The heads of the screws 58 and 60 are easily accessible and a spring that has been accidentally damaged may be readily replaced. The grooves 54 and 56 make it possible for the screws 58 and 60 to be adjusted forwardly or rearwardly and thus make it possible for the front graduations 50, 50 of the spring to be properly adjusted and located with respect to the front edge 16 of the plate 14. The said spring unit comprising the spring and the brackets may be maufactured and sold as a replacement unit for the instrument. In the said unit the graduations 50, 50 of the spring are closely adjacent the plane of the bottoms of the horizontal legs of the brackets, being thus relatively positioned so that they will be adjacent the top of the thin base plate 14 when the unit is assembled in the instrument.

The number of spring convolutions and the number of graduations may be widely varied, but I have shown a spring having 100 convolutions which are utilized, the spring having a minimum effective length of 1″ and a maximum effective length of 10″. The convolutions are spaced to provide 100 graduations per inch at an effective length of 1″ and to provide 10 graduations per inch at an effective length of 10″. The number of graduations per inch can be varied as required between the maximum of 100 and the minimum of 10. In describing the convolutions and the graduations as "spaced," reference is had to the spacing between the center lines of the convolutions and of the graduations.

An adjustable screw stop 68 on the base member 20 limits movement of the slide 34 toward the right, the extreme right position being shown in Figs. 1 and 4. In this position the spring has its maximum effective length of 10". An adjustable stop screw 66 on the base member 18 limits movement of the slide 34 toward the left, the extreme left position being shown in Fig. 5. In this position the spring has its minimum effective length of 1".

For reasons set forth in detail in the said Patent No. 2,530,955 the spring 46 preferably extends at the right beyond the 100th graduation (designated as "10"), and it is shown in Fig. 1 as having three complete additional convolutions at the right of the said 100th graduation. This avoids inaccuracies of convolution spacing which would result if the spring were rigidly attached at the said 100th graduation.

In the use of the instrument as hereinafter described it is necessary for the user to be able to readily select or identify the several graduations of the spring, regardless of the amount of extension thereof. The graduations may be partially identified by colored markings as hereinafter described, but even when colored markings are provided it is convenient for the user to also have movable mechanical means for indicating the graduations. I prefer to provide mechanical means for this purpose generally similar to those shown in Figs. 6 to 8 of the drawings of the said Patent No. 2,530,955.

A longitudinal rod 70 is provided which is closely adjacent the spring 46 and which extends through and fits aligned holes in the transverse members 18 and 20 of the base. Screws 72 and 74 hold the rod in place. The rod 70 also extends through a similar hole in the slide 34. Loosely surrounding the rod 70 and guided thereby is a coil spring 76 which has a number of convolutions the same as or proportional to the number of convolutions of the spring 46. As shown, the spring 76 has the same number of convolutions as the spring 46. The spring 76 is connected to the member 18 by means of a bracket 78 and a screw 80, and it is connected to the slide 34 by means of a bracket 82 and a screw 84. It will be observed that the length of the spring 76 varies in unison with the length of the spring 46. Indicators such as tabs 86, 86 are connected with selected convolutions of the spring 76 and are positioned to indicate corresponding convolutions or graduations of the spring 46. As shown, each 20th convolution of the spring 76 carries a tab 86, the several tabs being respectively marked "0," "2," "4," "8" and "10." Irrespective of the amount of extension of the springs the several tabs 86 will always register respectively with the "0," "20," "40," "60," "80" and "100" graduations of the spring 46. The intermediate graduations of the spring 46 can be readily determined particularly when they have colored markings as hereinafter described.

The tabs 86 can be connected with the spring 76 as shown in detail in Fig. 9. A small wire 88 is cemented to the bottom of each tab and is soldered to the top of the corresponding convolution of the spring 76.

In order that the spring 76 may be accurate for various degrees of extension, it is desirable or essential that after winding it be heated to a relieving temperature such that variations in strain due to the winding of the spring are diminished. The relieving temperature may range from 350° F. to 900° F. depending upon time. The heating of the spring to the relieving temperature preferably takes place with the spring on the rod 70 or on another similar rod. The soldering of each tab wire 88 to a spring convolution must be effected at a temperature below the before-mentioned relieving temperature. With a lower soldering temperature the soldering does not appreciably affect the characteristics of the spring as to the uniform extensibility thereof.

Fig. 1 shows one pattern of suitable colored markings that may be provided on the graduations of the spring 46. For clarity, only the colored markings are shown and the unmarked portions of the spring are omitted. The "0" graduation and all graduations that are multiples of 10 have the same color markings which may be red. All intermediate graduations which are multiples of 5 have another color which may be blue. All other graduations have another color marking which may be white. Preferably the intermediate graduations which are not multiples of 10 or 5 have shorter markings for increased convenience of reading. It may sometimes be preferable to form the described markings with paint or other material having self-luminous characteristics.

Fig. 10 shows schematically an alternative pattern of colored markings that may be provided on the graduations of the spring 46. This marking also may be self-luminous. For clarity, only the colored markings are shown and the unmarked portions of the spring are omitted. The "0" graduation and all graduations that are multiples of 10 have the same color markings which may be red as indicated by heavy lines in the said Fig. 10. The said red markings are all long. All other graduations have a different color marking which may be white.

In the first zone from "0" to "30" the white markings for the graduations "5," "15" and "25" are all long and the markings for the remaining graduations are all short. In the second zone from "30" to "60" the white markings for the graduations "35," "45" and "55" are all short and the white markings for the remaining graduations are all long. In the third zone from "60" to "90" the white markings for the graduations "65," "75" and "85" are all long and the white markings for the remaining graduations are all short, the third zone markings having the same pattern as those of the first zone. In the fourth zone from "90" to "100" the white markings for the graduation "95" is short and the white markings for the remaining graduations are all long, the fourth zone markings having the same pattern as those of the second zone.

From the said Fig. 10 of the drawing and from the foregoing description it will be apparent that the entire length of the spring is divided into four easily distinguished zones. For instance, if graduation "23" is to be used, it will be known to be the first zone and can be easily selected as being the third graduation after the long red "20" graduation. Or, if graduation "46" is to be used, it will be known to be in the second zone and can be easily selected as being the first graduation after the short white "45" graduation. With a marking pattern as shown in Fig. 10, it may be possible to dispense with the indicating tabs 86 and with the parts for carrying and moving them.

In looking generally downwardly on the instrument with the spring 46 extended, the bottom portions 48 of the spring convolutions would be visible in the absence of any provision to the contrary. These bottom portions would tend to distract attention from the upper portions 52 and from the graduations 50 and would cause difficulty in observing the said graduations. In order to avoid this condition, the said bottom portions 48 of the convolutions are preferably colored to match the color of the base or at least that of the plate 14 thereof. For instance, when the plate 14 of the base is black, the said bottom portions 48 of the spring convolutions are also black, thus becoming practically invisible. The color for the plate 14 of the base and for the said bottom portions 48 of the convolutions is such as to contrast with any of the colored markings on the front portions of the spring.

While it is only the bottom portions 48 which are required to match the color of the base, it is ordinarily preferable and more convenient to initially give the entire spring a surface finish, by any suitable method, which provides a color such as black that matches the color of the plate 14 of the base. With the entire spring initially colored as described, it would be difficult to properly observe the front portions 52 of the spring and the graduations 50 unless all of the said front portions were separately colored, as illustrated in Fig. 1 or in Fig. 10. The coloring of only some of the said front portions would not be sufficient. With all of the front portions colored they are all readily observable, inasmuch as they contrast with the color of the other parts of the spring and with the color of the plate 14 of the base. The said colored markings on the front portions 52 of the spring lead the eye of the user to the sharply bent portions which constitute the graduations 50.

A front top shield or cover 90 is provided which encloses the spring 46 and also encloses the spring 76 and its tabs 86 when the latter are provided, this shield or cover being transparent so that the spring 46 and the tabs 86 are readily visible. The cover 90 may be formed from any suitable transparent material and it extends at least throughout the maximum length of the spring. Preferably and as shown, the cover extends throughout the entire length of the base. The cover 90 is constructed and arranged for upward removal from the base and it is readily detachable. As shown, the cover is detachably held in place by screws 92 and 94 which are near the ends thereof and are entered in threaded holes in the portions 22 and 24 of the base members 18 and 20. The rear portion of the cover 90 is at least approximately in engagement with the base above the said thin portion 14 thereof and the cover includes a depending flange 96 which is at the front of the spring and extends downwardly at least approximately to the said thin portion 14 adjacent the straight front edge 16 thereof. Preferably and as shown, the bottom portion of the flange is at the front of the base portion 14, the lower edge of the flange being in the plane of the bottom of the base. When the cover is in place the spring 46, and also the spring 76 and its tabs 86 when provided, are fully protected from mechanical injury but are nevertheless clearly visible.

Preferably the shield or cover 90 partly encloses the base and more particularly the projections 22 and 24 at the ends thereof and the open-sided longitudinal spring recess between the said projections. The said cover has a uniform inverted channel shape throughout its length, and it has a depending flange 98 at the rear in addition to the said depending flange 96 at the front. The rear flange 98 fits or approximately fits grooves 100 and 102 in the said projections 22 and 24. The said flange 98 also extends through a groove 103 in the forward projection 44 of the slide 34. When the cover is in place as shown, the spring 46 and also the spring 76 with its tabs 86 are within the inverted channel of the cover.

As shown in Figs. 7 and 11, the inner and outer faces of the front flange 96 of the cover 90 are at substantial angles to the line of vision which may be assumed to be from the front and approximately normal to the base. The said inner and outer faces of the flange converge downwardly to constitute a prism and light directed upwardly from the spring graduations is refracted toward the left or toward the front in passing generally upwardly through the said flnage. The apparent positions of the said graduations are therefore offset toward the front from their actual positions. There can be considerable variation as to the exact relationship of the said faces of the flange 96, but as shown the said faces are curved with their centers of curvature spaced rearwardly from the flange. Preferably the said faces conform to circular arcs having different centers. When the inner face of the flange 96 is convexly curved as shown and described, the front faces of the base projections 22 and 24 and the front face of the slide projection 44 are preferably curved to at least approximately conform to the curvature of the said face.

In Fig. 1 the central portion of the cover 90 is broken away and the central graduations of the spring 46 are shown in their actual positions. The graduations at 50 are actually slightly behind the front edge 16 of the plate 14 and they are considerably behind the front face of the cover flange 96. However, when the spring is observed through the cover 90 and more particularly through the said flange 96 thereof, as shown in the left and right portions of Fig. 1, the described refraction of the light causes the spring portions 52 and the graduations 50 to have apparent positions that are offset or shifted forwardly to such an extent that the graduations appear to be at or very close to the outer or front face of the said flange 96. This forward shifting of the apparent positions of the graduations greatly facilitates the accurate use of the instrument. The graduations can be accurately located with respect to selected points on a chart or graph, and the graduations can be accurately used for marking selected points on the paper on which the instrument is placed.

Various parallel longitudinally extending scales are provided on the top of the base, these scales being indicated generally at 106. The several scales 106 are located between the before-mentioned widely separated portions of the guideway and of the slide, so that the slide extends transversely over the scales. The several scales are shown schematically in Fig. 1 and are shown in detail in Fig. 2.

Preferably the several scales 106 are on a plate 108 which is separate from the base and detachably secured to the front flat face thereof. The face carrying the scale plate 108 is at the rear of the spring 46 and is below the level of the main body of the slide 34 so that said main body may move over the plate. The ends of the plate 108 are respectively below the base members 18 and 20 as indicated at 108ª, 108ª. As shown, the plate 108 is secured to the base member 12 by screws 110, 110. The end portions of the plate 108 extend beneath the base members 18 and 20. The plate 108 is readily removable and it can be removed longitudinally in either direction when the screws 110, 110 have been removed. A different plate with other scales can be substituted.

For determining the position of the slide 34 with respect to the scales and for thus determining the degree of extension of the spring 46, the said slide 34 carries a transversely extending indicator which is arranged for registry with the graduations on the several scales as the slide is moved. As shown, a transparent member 112 is provided having a transverse hair line 114 which constitutes the said indicator, the said member 112 with its hair line or indicator being longitudinally movable along the scales when the slide is moved. The member 112 is connected with the slide at the front thereof and at the rear of the scales, as for instance by screws 116, 116. The several scales are so located and proportioned that the hair line 114 registers, or approximately registers, with the right ends of the scales when the spring 46 has its maximum extension as shown in Figs. 1 and 4. The several scales are further so located and proportioned that the hair line 114 registers, or approximately registers, with the left ends of the scales when the spring 46 has its minimum extension as shown in Fig. 5.

Carried by the member 112 is a vertically movable runner 118 which is frictionally held in any position to which it may be moved. The runner 118 is moved so that it registers with the particular scale that is to be used, thus avoiding errors that might otherwise arise from the inadvertent reading of the wrong scale.

Figure 2:
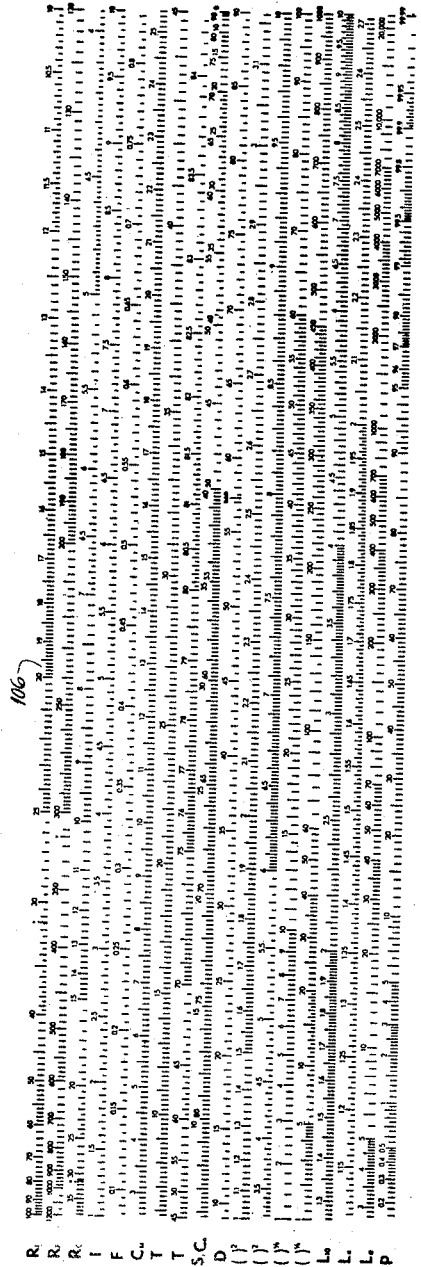
Fig. 2 is an enlarged plan view of the longitudinally extending scales provided on the top face of the instrument and shown only schematically in Fig. 1.

*Detailed description of scales shown in Figs. 1 and 2*

The number and character of the several scales 106 may be widely varied, but as shown there are eighteen scales as follows:

Group 1.—Reciprocable scales similar to the scale 52 shown in the said Patent 2,530,955 and serving for each amount of spring extension to show the number of graduations per unit of length.

$R_I$—This shows the number of graduations per inch.
    $R_F$—This shows the number of graduations per foot.
    $R_C$—This shows the number of graduations per centimeter.

*Group II.*—Linear scales similar to scale 58 shown in the said Patent 2,530,955 and serving to show the amount of spring extension in units of length.

I—This shows the amount of spring extension in inches.

F—This shows the amount of spring extension in feet.

C—This shows the amount of spring extension in centimeters.

*Group III.*—Trigonometric scales for reading, plotting and interpolating trigonometric functions, phase angles, amplitudes and nomograms.

T—This scale represents tangents.

T—This scale also represents tangents.

$S,C_o$—This scale represents sines and cosines.

D—This scale represents angular degrees.

*Group IV.*—Power scales for reading, plotting and interpolating square, square root and cube root curves or scales.

$()^2$—This scale represents squares.

$()^2$—This scale also represents squares.

$()^{1/2}$—This scale represents square roots.

$()^{1/3}$—This scale represents cube roots.

*Group V.*—Logarithmic scales for reading, plotting and interpolating logarithmic graphs, curves and scales, and for reading, plotting and interpolating nomograms and power ratios of curves.

$L_{10}$—This scale represents logarithms with a base of 10.

$L_e$—This scale represents logarithms with a base of $e$.

$L_e$—This scale also represents logarithms with a base of $e$.

*Group VI.*—Probability scale for reading, plotting and interpolating probability functions in statistical work.

P—This is a probability scale.

Due to the fact that the spring 46 has a definitely limited minimum length, shown as being 1″, each of the scales is terminated at the left at a position corresponding to the said minimum spring length. Thus the hair line or indicator 114 registers with the left or first ends of the scales when the spring is at its minimum length. The indicator registers with the right or second ends of the scales when the spring is at its maximum length. The moduli of the several scales are such that, if it were possible for the spring 46 to have 0 length with corresponding additional movement of the slide toward the left to a hypothetical zero spring length position and if the scales were correspondingly extended toward the left, the said scales would have the following values at said zero spring length position of the slide:

| | | |
|---|---|---|
| $R_I$ | Reciprocal Inch | Infinity. |
| $R_F$ | Reciprocal Foot | Infinity. |
| $Rc_M$ | Reciprocal Centimeter | Infinity. |
| I | Linear Scale | 0. |
| F | Linear Scale | 0. |
| $C_M$ | Linear Scale | 0. |
| T | Tangent | 0 Degrees. |
| T | Tangent | 0 Degrees. |
| $SC_o$ | Sine | 0 Degrees. |
| $SC_o$ | Cosine | 90 Degrees. |
| D | Degree | 0 Degrees. |
| $()^2$ | Square | 0. |
| $()^2$ | Square | 0. |
| $()^{1/2}$ | Square Root | 0. |
| $()^{1/3}$ | Cube Root | 0. |
| $L_{10}$ | Logarithmic, base 10 | 1. |
| $L_e$ | Logarithmic, base $e$ | 1. |
| $L_e$ | Logarithmic, base $e$ | 1. |
| P | Probability | .001. |

There are two companion tangent T scales, two companion square $()^2$ scales, and two companion logarithmic $L_e$ scales. The two companion scales of each pair have different moduli so that the value at the second end of one of them is at least approximately the same as the value at the first end of the other of them.

It has been pointed out that the spring 46 has additional convolutions, as for instance three convolutions, at the right of the 100th graduation. The markings on the several scales 106 must be spaced to provide proper compensation for the additional spring length. The square scales $()^2$ will be referred to as examples, it being understood that similar compensations are made in all of the other scales.

With the slide set at the right end of the scale as shown in Fig. 1, the distance between the two end graduations "0" and "100" of the spring must be exactly 10″. However, the right end of each scale must be at a different distance from a theoretical reference point at the left. This theoretical reference point represents the position to which the scales would be extended toward the left if the wire of the spring had 0 diameter so that the minimum length of the spring would be 0. The said distance of the right end of each scale from the said reference point is equal to 10″ plus the spacing between the three additional spring convolutions which is .3″, the total distance being 10.3″. Similar variations in the scales must be made throughout their lengths. The left end of each scale must be at a distance from the said theoretical reference point which is equal to 1″ plus one-tenth of the spacing between the three additional spring graduations which is .03″, the total distance being 1.03″. From the foregoing it will be apparent that the total distance between the left and right ends of each of the square scales $()^2$, instead of being exactly 9″, must be 10.3″ minus 1.03″ which is 9.27″. Similar variations are made in each of the other scales 106, the length of each of them being 9.27″.

The spacings of representative graduations of the square scales $()^2$ will be more readily apparent from the following table:

| a | b<br>$a^2$ | c<br>$(b/100) \times 10.3$ | d<br>$c-1.03$ | e<br>$(c \times 10)-1.03$ |
|---|---|---|---|---|
| 1.0 | 1.00 | .103 | | .0 |
| 1.5 | 2.25 | .232 | | 1.29 |
| 2.0 | 4.00 | .412 | | 3.09 |
| 2.5 | 6.25 | .644 | | 5.41 |
| 3.0 | 9.00 | .927 | | 8.24 |
| 3.5 | 12.25 | 1.26 | .23 | |
| 4.0 | 16.00 | 1.65 | .62 | |
| 5.0 | 25.00 | 2.58 | 1.55 | |
| 6.0 | 36.00 | 3.71 | 2.68 | |
| 7.0 | 49.00 | 5.05 | 4.02 | |
| 8.0 | 64.00 | 6.59 | 5.56 | |
| 9.0 | 81.00 | 8.34 | 7.31 | |
| 10.0 | 100.00 | 10.30 | 9.27 | |

Column $a$ sets forth representative numbers and column $b$ sets forth the squares of the said numbers. Column $c$ represents the actual spacings of the scale graduations from the before-mentioned reference point. The values in column $b$ have been divided by 10 to conform to the modulus of the scale, and the said numbers divided by 10 have been multiplied by the factor 1.03 which represents the variation resulting from the three additional spring convolutions as previously explained.

The left end of each scale starts at a distance of 1.03″ from the said reference point. Therefore the spacings of the graduations from the left ends of the scales are the values set forth in column $c$, minus 1.03. Up to a point between the square of 3.0 and the square of 3.5 the values in column $d$ would be negative and they are not given as they would represent positions at the left of the left end of the scale. The values in column $d$, together with all required intermediate and other values, are plotted to constitute the second square scale $()^2$.

Column $e$ is similar to column $d$, except that the values in column $c$ are multiplied by 10 before subtracting 1.03. The values in column $e$, together with all required intermediate and other values, are plotted to constitute the first square scale $()^2$. The two square scales $()^2$ represent the squares of all numbers from 1 to 10 inclusive.

Similar procedures are followed for plotting all of the scales 106. Two T scales are required and two $L_e$ scales are required, but in all other instances a single scale is sufficient.

Figure 3:
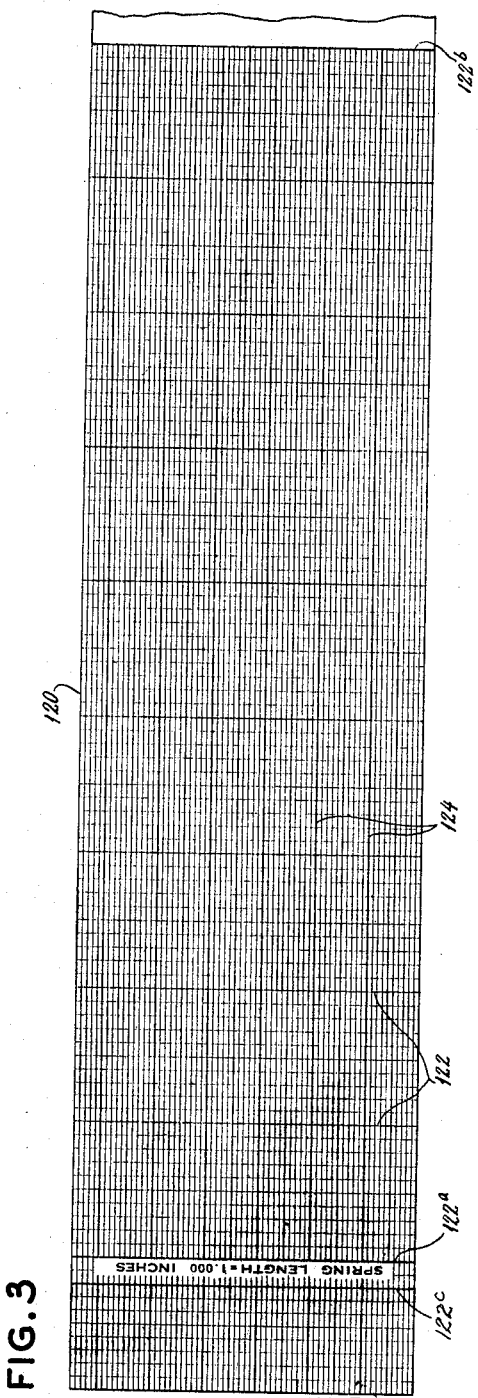
Fig. 3 is an enlarged plan view of a graph sheet on the front face of the instrument and shown only schematically in Fig. 1.

*Graph sheet shown in Figs. 1 and 3*

For many procedures involving computation, calculation or plotting, it is highly advantageous to provide a graph sheet 120 formed of material upon which various points and graphs can be plotted, this graph sheet having transverse and longitudinal coordinate lines. The graph sheet 120 may be formed of paper and preferably it is readily removable and replaceable. Alternatively the graph sheet may be a permanent plate with lines etched or otherwise provided thereon and having a surface upon which erasable markings may be made. The said graph sheet 120 is shown schematically in Fig. 1 and is shown in detail in Fig. 3. As shown, the graph sheet has main transverse lines 122 with 1" spacings and has decimally spaced intermediate transverse lines, and the said sheet also has uniformly spaced main longitudinal lines 124 and has decimally spaced intermediate longitudinal lines. The said transverse lines are parallel to an ordinate axis and the said longitudinal lines are parallel to an abscissa axis. As shown, the graph sheet 120 has ten main transverse lines and seven main horizontal lines including front and rear lines, but the numbers of lines may be changed to meet different requirements. A main first transverse line near the left is designated as 122$^a$ and the main last transverse line at the right is designated as 122$^b$. The distance between the said first and last lines 122$^a$ and 122$^b$ is 9.27", this distance having been determined in the manner previously explained in connection with the scales 106. The said graph sheet 120 is so located on the base of the instrument that the hair line or indicator 114 on the slide is movable over the sheet. The said hair line registers with the first or left transverse line 122$^a$ when the spring 46 has its minimum effective length of 1" and registers with the last or right transverse line 122$^b$ when the spring 46 has its maximum effective length of 10", as shown in Fig. 1. When the graph sheet is located as shown at the rear of the several scales 106, the first or left transverse line 122$^a$ is in register with the left ends of the scales and the last or right transverse line 122$^b$ is in register with the right ends of the scales.

Preferably, each graph sheet 120 is initially provided with a portion at the left of the transverse line 122$^a$, as shown in Fig. 3, and the said sheet is transversely scored along a line 122$^c$ at the left of the said line 122$^a$. In practice, the portion at the left of the said scored line 122$^c$ is torn off and only the portion at the right of said scored line is used. Fig. 1 shows only the portion of the sheet at the right of the scored line.

As shown, the base member 12 is provided with an exposed upwardly facing area or surface 126 at the rear of the scales 106 for receiving and supporting the graph sheet 120. The graph sheet may be removably held in place on the surface 126 by any suitable means such as pressure sensitive adhesive tape, not shown. As shown in Fig. 1, the right end of the graph sheet 120 is below the slide 34, as indicated at 120$^a$. The slide 34 and the member 112 thereon are of such size as to extend transversely over the graph area or surface 126 so that the hair line or indicator 114 can be utilized for locating the slide with respect to various points on a graph on the sheet 120.

Numbers such as 1 to 7 may advantageously be marked on the transparent member 112 on the slide, these numbers registering respectively with the several longitudinal lines 124 of the graph sheet. The said numbers facilitate the use of the graph sheet as hereinafter explained.

The graph sheet 120 is not ordinarily used simultaneously with any of the scales 106, but it is shown as mounted on the said separate area 126 at the rear so that the scales may be used as required without removing the graph sheet. Alternatively, the graph sheet 120 may be mounted on the scale plate 108 over the several scales 106 and held in place thereon as previously stated. When the graph sheet is mounted as last above-described, the separate sheet area 126 on the base member 12 may be omitted and the instrument may be made correspondingly narrower.

*Instrument as shown in Figs. 12 and 13*

Figs. 12 and 13 show an alternative embodiment of the invention, which is generally similar to that shown in Figs. 1 to 11. It will be understood that the markings on the spring 46 as shown in Fig. 12 preferably conform to those shown in Fig. 10 rather than those shown in Fig. 1.

The instrument as shown in Figs. 12 and 13 differs from that shown in Figs. 1 to 11 in that an additional plate 128 is provided at the bottom which projects forwardly beyond the spring 46 and beyond the front edge of the plate 14. The plate 128 is preferably detachable so that it can be readily removed, and as shown it is held in place by two or more screws 130 as shown in Fig. 13. The plate 130 is provided with a longitudinal scale 132 located immediately adjacent the graduations 50, 50 of the spring or at least immediately adjacent the apparent positions of the said graduations. This makes it possible for the amount of spring extension to be read directly on the scale without the use of other scales or of an indicator on the slide. The scale 132 may be variously graduated either linearly or nonlinearly, but as shown it has uniformly spaced graduations representing even numbers from 0 to 500. When the spring is fully extended, the 100 graduation of the spring registers with the "500" graduation of the scale.

The plate 128 carrying the scale 132 is preferably formed of transparent material so that the instrument may be placed on a chart or map and so that the said chart or map may be observed through the plate, values on the chart or map being read in conjunction with the values of the fixed scale 132 or in conjunction with the variable scale 46.

When the scale plate 128 is not to be used, it is ordinarily removed in order that the scale 46 may be close to the positions on the paper at which the plotting, interpolating or the like are to be effected.

*Instrument as shown in Figs. 14 to 17*

Figs. 14 and 15 show an instrument generally similar to that shown in Figs. 1 to 11, but differing primarily in that the front spring 46 is omitted. A spring 134 generally similar to the spring 76 constitutes an extensible scale for measuring, plotting, interpolating and the like. The instrument shown in Figs. 14 and 15 is useful when there is no requirement for great accuracy and when reduced cost is an important factor.

In the instrument shown in Figs. 14 and 15 a plate 136 is provided which is similar to the plate 14 but which is made of transparent material. When the instrument is placed on a chart or map, values on the chart or map may be read in conjunction with the extensible scale provided by the spring 134. The convolutions of the spring 134 may have colored markings thereon such as those indicated in Fig. 1 or such as those indicated in Fig. 10. The spring 134 has tabs 86 thereon similar to those shown in Figs. 1, 4, 5 and 9.

Alternatively the spring 134 may have tabs 138 similar to the tabs 86 but connected at the bottom of the spring instead of at the top thereof, such a tab being shown in Fig. 16.

As a further alternative, a spring 134$^a$ similar to the spring 134 may have tabs thereon connected as shown in Fig. 17. Each tab is connected with a short wire 140 which extends between two convolutions of the spring and which is soldered at 142, 142 to both of the said convolutions. When each tab wire 142 is soldered to two spring convolutions, the spring must have a correspondingly greater total number of convolutions.

*Use of instrument with utilization of scales shown in Figs. 1 and 2*

Each of the scales 106 in groups I and II may be used for plotting, interpolating and the like in the handling of problems wherein only uniform linear spacings are necessary. The reciprocal scales of group I enable the spring to be adjusted so as to have any required number of graduations per unit of length within the capacity of the instrument. The linear scales of group II enable the spring to be adjusted to any required total length within the capacity of the instrument.

The scales of groups III to VI have radically different purposes and uses in that they enable the instrument to be used for plotting, interpolating and the like with respect to non-uniform spacings corresponding to various mathematical functions represented by the respective scales. Each of the scales in groups III to VI makes it possible to reproduce all or any portion of a corresponding scale on a drawing sheet, the drawing sheet scale having a modulus approximating that of the instrument scale or having any smaller modulus within the capacity of the instrument. It is possible, within the capacity of the instrument, to interpolate between any two points having mathematical functions corresponding to those of the scale, or to determine the functional value of any point when the functional values of other points are known. The scales in combination with the extensible spring have various other uses which need not be explained in detail.

The maximum modulus of a reproduced drawing scale has a ratio of 100 to 103 with respect to the modulus of the corresponding instrument scale, this ratio being hereinafter referred to as the "modulus factor."

In more particularly explaining the manner of use of the scales in groups III to VI it will be sufficient to use one of them as an example and the sine-cosine scale $SC_o$ will be so used. In Fig. 18 the lower line represents a portion of the $SC_o$ scale of the instrument, and the upper line is a base line on a drawing sheet on which are to be plotted various points having sine spacings and constituting a sine scale 144. By placing the instrument on the drawing sheet with the graduations 50, 50 adjacent the said base line and by setting the slide of the instrument with the hair line or indicator 114 on selected successive points on the $SC_o$ scale, points such as $6^a$, $8^a$, $10^a$, $15^a$, $20^a$ etc. having sine spacings may be plotted on the said base line by marking the successive positions of the 100 graduation of the spring. The 0 graduation of the spring remains stationary and a mark $0^a$ at the said 0 graduation represents the sine value of 0° which is 0. This 0 value does not appear on the instrument scale. The result is a sine scale 144 which, except for the modulus factor, has the same modulus as that of the instrument scale $SC_o$.

Any sine scale having a modulus smaller than that of the scale 144 may be readily plotted, as for instance a scale 146 wherein the sine value 50 it as $50^b$ instead of at $50^a$ and wherein other points such as $40^b$, $30^b$, $20^b$, $15^b$, $10^b$, $8^b$, $6^b$ and $0^a$ are proportionately located. This is done as follows:

A. With the instrument placed with the 0 graduation of the spring at $0^a$ on the scale 144 and with the 100 graduation at $50a$ on the said scale 144, note the reading at $50^b$ on the graduated spring 46. This reading represents the ratio between the modulus of the scale 146 and that of the scale 144, that is, the ratio of the length $0^a$–$50^b$ to the length $0^a$–$50^a$. This ratio is referred to as a "constant." In the example given, the constant is .75.

B. Without shifting the instrument, set the slide indicator successively at other points on the instrument scale $SC_0$ such as 40, 30, 20, 15, 10, 8 and 6 and make marks $40^b$, $30^b$, $20^b$, $15^b$, $10^b$, $8^b$ and $6^b$ at the corresponding positions of the "constant" .75 on the graduated spring 46. This produces a second sine scale of smaller modulus.

Referring to Fig. 19, 148 represents a graph wherein the sine values $10^c$ and $50^c$ have been previously plotted and wherein the sine value of a point C is not known and is to be determined. The length between the points $10^c$ and $50^c$ is less than the length between the corresponding points on the instrument scale $SC_0$, but the modulus or ratio is not known. To determine the sine value at C the procedure is as follows:

$A^1$. Set the slide indicator to 10 on the instrument scale $SC_0$ and place the instrument with the graduation 100 of the spring at the point $10^c$ of the graph 148. The graduation 0 of the spring is at a point corresponding to the sine value of 0 as represented by the $SC_0$ scale, and this point 0 may be marked on the graph although such marking is not necessary.

$B^1$. Without shifting the instrument, set the slide indicator to 50 on the instrument scale $SC_0$ and make a mark D on the graph at the 100 graduation of the spring. Except for the modulus factor, the length $10^c$–D on the graph 148 is the same as the length 10–50 on the instrument scale $SC_0$.

$C^1$. Place the instrument with the 0 graduation of the spring at the point $10^c$ of the graph 148 and with the 100 graduation of the spring at the point D of the said graph, and note the reading at $50^c$ on the graduated spring. This reading is a "constant" which represents the ratio of the length $10^c$–$50^c$ to the length $10^c$–D and which, except for the modulus factor, represents the ratio of the modulus of the graph 148 to the modulus of the instrument scale $SC_0$. In the example given, the constant is .81.

$D^1$. Set the slide indicator at 50 on the instrument scale $SC_0$ and place the instrument with the "constant" .81 on the spring at the point $50^c$ on the graph. Make a mark $0^c$ at the 0 graduation of the spring. This locates the value of the sine of 0 in proper relationship to the initially known points $10^c$ and $50^c$. With the point $0^c$ located, any point between $0^c$ and $50^c$ has a sine value readily determined by the "constant" .81 arrived at as set forth in the above paragraph $C^1$.

$E^1$. Without shifting the instrument, that is, with the 0 graduation of the spring remaining at the point $0^c$, move the slide so that the "constant" .81 on the spring is at the point C. Observe the reading of the slide indicator on the instrument scale $SC_0$; this reading being the previously unknown sine value of the point C. In the example given, this value is 29.

If the initially plotted values include the point $0^c$ having the sine value of 0 and another sine value such as 50 represented by a point $50^c$, the procedure is simpler and is as follows:

$A^2$. Set the slide indicator at 50 on the instrument scale $SC_0$ and place the instrument with the 0 graduation of the spring at the point $0^c$. Read the "constant" on the spring at the point $50^c$, this "constant," except for the modulus factor, representing the ratio of the modulus of the graph 148 to the modulus of the instrument scale $SC_0$. In the example given, this constant is .81 as before.

$B^2$. Without shifting the instrument, move the slide so that the "constant" .81 on the spring is at the point C. Observe the reading of the slide indicator on the instrument scale $SC_0$, this reading being the previously unknown sine value of the point C, which is 29.

It will be understood by those skilled in the art and without further explanation that the other scales 106 in groups III to VI may be used similarly to the scale $SC_0$, the differences in the manner of use arising from the differences in the mathematical functions of the scales.

For many types of plotting or calculation the instrument is placed vertically or at selected oblique angles instead of horizontally. Various graphs or curves can be plotted or the values of points on previously plotted curves or graphs can be determined. Interpolations can be made as desired between points on previously plotted curves or graphs, these interpolations being in accordance with the mathematical functions of any of the scales.

*Use of instrument with utilization of graph sheet shown in Figs. 1 and 3*

The graph sheet 120 shown in Figs. 1 and 3 is adapted for use in the same general manner as the scales 106, and is particularly useful when plotting, interpolating, observing or the like are to be in accordance with a mathematical function or formula, or other variable, not suitably represented by one of the scales 106 of the instrument.

In each instance the mathematical function or variable to be used is plotted as a graph on the graph sheet between the front and rear longitudinal lines, the linear values being plotted in the ordinate direction along the transverse lines 122 and the nonlinear functions being plotted in the abscissa direction along the longitudinal lines 124. The plotted mathematical functions may be the same as those of one of the scales 106, but perhaps with a different modulus, or the said functions may be those of a complex mathematical formula, or the said functions may be empirically determined. The length of the indicator line 114 is commensurate with the width between the front and rear longitudinal lines of the graph sheet, and said indicator line is therefore adapted to intersect any graph on said sheet between said front and rear lines. For any particular amount of spring extension, the intersection of the indicator or hair line 114 with the curve or graph plotted on the graph sheet is read from the longitudinal lines of the graph and this reading represents the mathematical function corresponding to the spring extension. Thus any of the procedures that can be followed with the scales 106 can be also followed with a graph on the graph sheet, the graph sheet having the advantage that mathematical functions corresponding to those of the scales can be plotted with any desired different modulus and having the further advantage that it is not limited to a few preselected mathematical functions.

Figure 20:
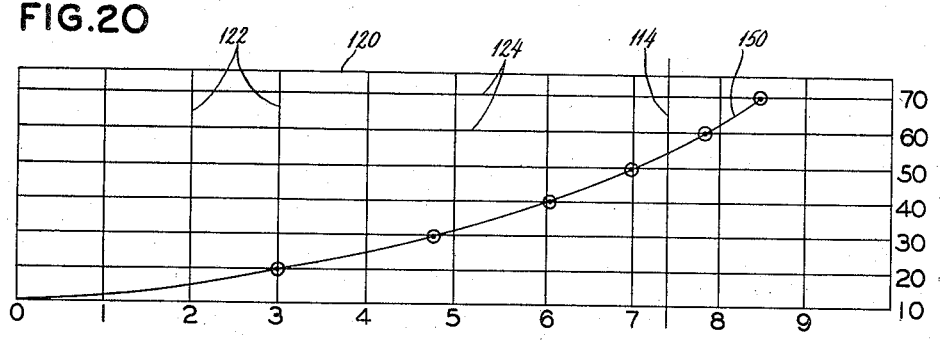
Fig. 20 is a schematic showing of a graph sheet with a curve or graph plotted thereon.

As an example, reference is made to Fig. 20 wherein a logarithmic graph 150 has been plotted on the graph sheet 120. The linear values 10 to 70 have been plotted in the ordinate direction along the transverse lines 122 and the logarithmic functions of the said numbers have been plotted in the abscissa direction along the longitudinal lines 124. For instance, the logarithmic function of 30 has been plotted on the longitudinal line designated as 30 and has an abscissa value of .4771 between the transverse lines designated as .4 and .5. The indicator or hair line 114 is longitudinally movable over the graph sheet and if the spring 46 is to be extended to an amount corresponding to the logarithm of 55, the indicator 114 is placed at the intersection of the graph 150 with a longitudinal line interpolated between the longitudinal lines 50 and 60 and having an ordinate value of 55.

Figure 21:
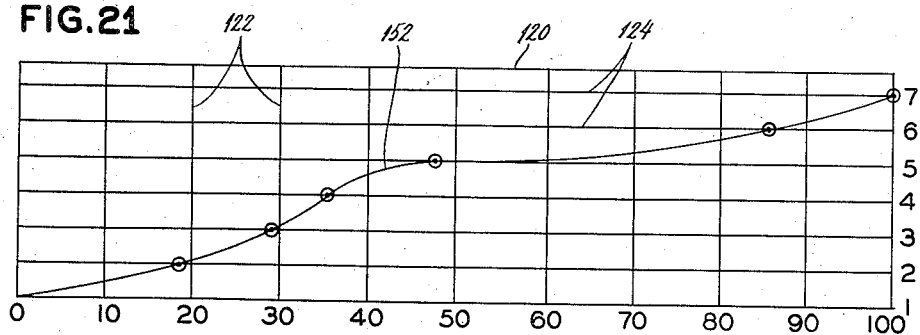
Fig. 21 is a schematic showing of a graph sheet with a different curve or graph plotted thereon.

As a further example, the graph in Fig. 21 represents empirically determined values which represent the correction calibrations for an instrument such as an oscillograph, wherein the recorder moves over a range from 1 to 7. Due to the inherent characteristics of the oscillograph the recorder at various positions indicates varying percentages of a known maximum value, which for example may be assumed to be 70,000 pounds per square inch. For various amplitudes of recorder movement, these percentages have been determined to be

| | Percent |
|---|---|
| 1 | 0 |
| 2 | 19.2 |
| 3 | 29.4 |
| 4 | 35.7 |
| 5 | 48.1 |
| 6 | 85.9 |
| 7 | 100.0 |

The linear functions 1 to 7 are plotted on the graph sheet in the ordinate direction along the transverse lines 122 and the corresponding percentages are plotted in the abscissa direction along the longitudinal lines 124 to produce a curve or graph 152.

Figure 22:
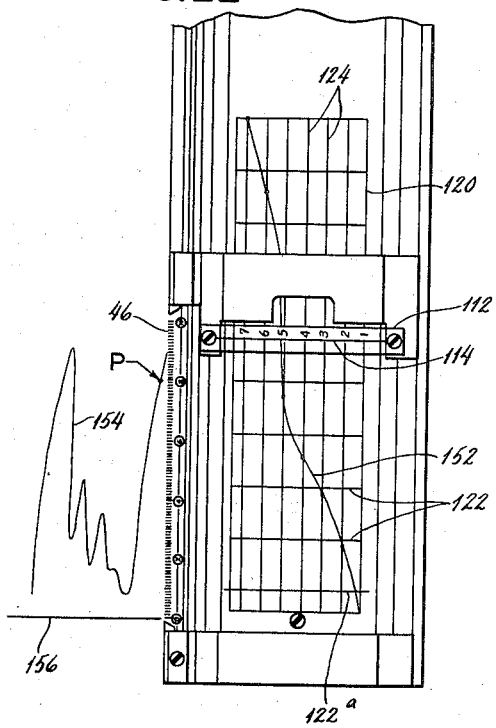
Fig. 22 is a schematic view showing the manner of use of the instrument when the graph sheet thereof has a curve or graph plotted as shown in Fig. 21.

Fig. 22 shows schematically how the instrument is used for reading the values of points on an oscillogram 154 made by an oscillograph having the above-stated characteristics. For convenience of illustration, the graph sheet 120 is shown in Fig. 22 as being on top of the scales 106. The modulus of the amplitude values of points on the oscillogram 154 is ordinarily different from the modulus of the nonlinear values plotted in the abscissa direction on the graph 152. The ratio of the amplitude modulus to the graph modulus is determined in any suitable manner as for instance by the use of the variable scale of the instrument. This ratio is called a "constant" and will be assumed to be .80.

For reading the values of various points on the oscillogram 154, the instrument is placed transversely with the 0 graduation of the spring on a base reference line 156. The slide is moved so that the "constant" .80 on the spring 46 is at or in register with a selected point P on the oscillogram 154. The use of the constant causes the movement of the slide with its indicator to have the same modulus as that of the nonlinearly plotted functions of the graph 152. For each point such as P on the oscillogram the intersection of the indicator 114 with the graph 152 is read on the longitudinal lines 124 of the graph sheet. The numbers on the member 112 facilitate this reading. As shown, the value on the oscillogram at the point P is read at the corresponding intersection between the longitudinal lines designated as 5 and 6 and is 51,000 pounds per square inch. Thus the values represented by points on the oscillogram may be read directly without any separate computations.

*Use of instrument as shown in Figs. 12 and 13*

The plate 128 with the scale 132 thereon makes it possible to very rapidly make certain simple calculations by reading the spring graduations directly on the scale and without the use of any of the scales 106 or of the graph sheet 120.

As an example, assume that it is known that an airplane has traveled 40 miles in 17 minutes and it is desired to determine how much time at the same speed will be required to complete the flight which is known to be 149 miles. The slide is moved so that the graduation 17 of the spring 46 is at 40 on the scale 132. Then the user observes the spring reading at the point 149 on the scale 132 which reading is 63.3, this being the total number of minutes for the flight.

As a further example and with the same initial information, assume that it is desired to know the distance that will be traveled in 90 minutes at the same speed. The slide is moved as before so that the graduation 17 of the spring is at 40 on the scale 132. Then the user observes the scale value at the graduation 90 of the spring which scale value is 211.8, thus being the miles of travel in 90 minutes.

*Use of instrument as shown in Figs. 14 to 17*

The manner of use of the instrument shown in Figs. 14 to 17 is or may be generally similar to that of the instrument shown in Figs. 1 to 12 and extended detailed explanation is not necessary. It should be observed, however, that the plate 135 below the spring 134 is transparent so that the instrument may be placed over and used in conjunction with a previously plotted or prepared chart or map. The instrument shown in Figs. 14 to 17 is particularly adapted for purposes wherein great accuracy is not required.

The invention claimed is:

1. In an instrument of the class described, the combination of a longitudinally extending base having a thin front portion immediately adjacent the bottom plane thereof and having a straight longitudinal guideway at the top, a slide rectilinearly movable along the guideway and having a forward projection above the said thin portion of the base, a longitudinally extending coil spring connected at one end with the base and at the opposite end with the said forward projection of the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, means for limiting slide movement in one direction to provide a minimum spring length and for limiting slide movement in the opposite direction to provide a maximum spring length, and a transparent cover over the spring and over the forward projection of the slide and extending throughout the maximum length of the spring which cover is detachably secured to the said base, the said cover being constructed and arranged for upward removal from the base and the said cover having an inverted channel shape and including two downwardly extending longitudinal flanges one of which is at the rear of the spring and extends downwardly below the level of the top of said spring and the other of which is at the front of the spring and extends downwardly at least approximately to the said thin portion of the base adjacent the front edge thereof.

2. An instrument as set forth in claim 1, wherein the base has a substantially flat front face at the rear of the spring and below the level of the top of the slide, and wherein the rear flange of the cover extends downwardly below the level of the said front face of the base.

3. An instrument as set forth in claim 1, wherein the base at the end portions thereof has longitudinal open-top grooves for receiving and fitting the rear flange of said cover, wherein the top of the forward projection of the slide is above the level of the bottom of the rear flange of said cover, and wherein said projection of the slide has a longitudinal open-top groove for receiving said rear flange of said cover.

4. In an instrument of the class described, the combination of a longitudinally extending base having a thin front portion immediately adjacent the bottom plane thereof and having a straight longitudinal guideway at the top, a slide rectilinearly movable along the guideway and having a forward projection above the said thin portion of the base, a longitudinally extending coil spring which is connected at one end with the base and at the opposite end with the said forward projection of the slide and which has its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, a second longitudinally extending coil spring located close to and at the rear of the first said spring and having its convolutions uniformly spaced longitudinally, the said second spring being also connected at one end with the base and at the opposite end with the forward projection of the slide so that the spacings between all of the convolutions thereof are varied when the total spring length is varied by movement of the slide, indicators on some of the convolutions of the second spring and registering with selected convolutions of the first spring to distinguish selected graduations thereof, and a transparent cover over both of said springs and over said indicators on said second spring which cover is constructed and arranged for upward removal from the base and has an inverted channel shape and includes two downwardly extending longitudinal flanges one of which is at the rear of second said spring and extends downwardly below the levels of the tops of said springs and the other of which is at the front of first said spring and extends downwardly at least approximately to the said thin portion of the base adjacent the front edge thereof.

5. In an instrument of the class described, the combination of a longitudinally extending base having a thin front portion immediately adjacent the bottom plane thereof and having a straight longitudinal guideway at the top, a slide movable along the guideway and having a forward projection above the said thin portion of the base, a longitudinally extending coil spring connected at one end with the base and at the opposite end with the said forward projection of the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, and a transparent cover for the spring having a flange at the front of said spring and extending downwardly at least approximately to said thin portion of the base which flange is provided with downwardly converging inner and outer faces and which flange by reason of its said converging faces refracts light and serves when the instrument is viewed from the top thereof to cause the spring graduations to have apparent positions that are substantially forward from their actual positions.

6. An instrument of the class described as set forth in claim 3, wherein said front flange of the cover extends downwardly over the front edge of said thin portion of the base and has its lower edge in the plane of the bottom of the base.

7. An instrument of the class described as set forth in claim 5, wherein the said inner and outer faces of the cover flange are curved with their centers of curvature spaced rearwardly from the said flange.

8. In an instrument of the class described, the combination of a longitudinally extending base having a thin front portion immediately adjacent the bottom plane thereof and having a straight longitudinal guideway at the top, a slide rectilinearly movable along the guideway and having a forward projection above the said thin portion of the base, a longitudinally extending coil spring connected at one end with the base and at the opposite end with the said forward projection of the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, means for limiting slide movement in one direction to provide a minimum spring length and for limiting slide movement in the opposite direction to provide a maximum spring length, a transparent cover over the spring and over the forward projection of the slide and extending substantially throughout the maximum length of the spring which cover is constructed and arranged for upward removal from the base and is detachably connected therewith, the said cover including a flange which extends downwardly at the front of the spring at least approximately to the said thin portion of the base adjacent the front edge thereof and which has downwardly converging inner and outer faces serving to refract light and thus serving when the instrument is viewed from the top thereof to cause the spring graduations to have apparent positions that are substantially forward from their actual positions.

9. In an instrument of the class described, the combination of a longitudinally extending base having a thin front portion immediately adjacent the bottom plane thereof and having a straight longitudinal guideway at the top, a slide rectilinearly movable along the guideway, two similar forward projections located respectively on the base near one end thereof and on the slide and adapted for the attachment of a spring unit, the said projections respectively having two vertical transverse walls facing toward each other and the said projections having aligned longitudinal grooves therein open at the front faces thereof, two similar aligned longitudinal screws located respectively in the said grooves in the said projections, and a detachable spring unit comprising a longitudinally extending coil spring and comprising two brackets connected respectively with the ends of the spring, the said brackets of the said spring unit being engaged respectively by the said screws so as to be detachably held respectively in engagement with the said vertical transverse walls on the two projections and the spring of the said spring unit having its convolutions uniformly spaced longitudinally so that the spacings between all of the convolutions are uniformly varied when the spring length is varied by movement of the slide which spring is located and shaped to enable the several convolutions thereof to constitute graduations closely adjacent the said thin portion of the base and near the front edge thereof.

10. In an instrument of the class described, the combination of a longitudinally extending base having a thin front portion immediately adjacent the bottom plane thereof and having a straight longitudinal guideway at the top, a slide movable along the guideway, two similar forward projections located respectively on the base near one end thereof and on the slide and adapted for the attachment of a spring unit, the said projections respectively having two vertical transverse walls facing toward each other and the said projections having aligned longitudinal grooves therein open at the front faces thereof, two similar aligned longitudinal screws located respectively in the said grooves in the said projections, and a detachable spring unit comprising a longitudinally extending coil spring and comprising two similar angle brackets having transverse vertical legs and having registering horizontal legs which are connected respectively with the ends of the spring, the vertical legs of the said brackets of the said spring unit being engaged respectively by the said screws so as to be detachably held respectively in engagement with the said vertical transverse walls on the two projections and the horizontal legs of the said brackets being in engagement with the top of the thin front portion of the base to prevent rotative movement of the spring unit and the spring of the said spring unit having its convolutions uniformly spaced longitudinally so that the spacings between all of the convolutions are uniformly varied when the spring length is varied by movement of the slide which spring is located and shaped to enable the several convolutions thereof to constitute graduations closely adjacent the said thin portion of the base and near the front edge thereof.

11. A detachable spring unit for an instrument of the class described comprising in combination, a longitudinally extending coil spring and two similar angle brackets having transverse vertical legs and having registering horizontal legs which are connected respectively with the ends of the spring, the vertical legs of said brackets of the said spring unit having threaded holes for attachment screws and the spring of the said spring unit having its convolutions uniformly spaced longitudinally so that the spacings between all of the convolutions are uniformly varied when the spring length is varied which spring is located and shaped to enable the several convolutions thereof to constitute graduations closely adjacent the plane of the bottoms of the said horizontal legs of the brackets.

12. In an instrument of the class described, the combination of a longitudinally extending base having a thin front portion adjacent the bottom plane thereof and having a straight longitudinal guideway at the top, the said guideway comprising two widely spaced front and rear portions, a slide movable along the guideway and having a forward projection located above the said thin portion of the base, the said slide having two widely spaced front and rear portions engaging respectively with the front and rear portions of the guideway, a longitudinally extending coil spring connected at one end with the base and at the opposite end with the said forward projection of the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, a plurality of longitudinally extending scales located at the top of the base and between the said widely spaced portions of the guideway and of the slide, an indicator connected to and movable with the slide and extending transversely over all of the several scales for registry with the graduations of any of them as the slide is moved to vary the length of the spring, and a runner carried by the slide and transversely adjustable thereon which runner is adjacent the indicator and serves to facilitate the observation of the registration of the indicator with the graduations of any selected scale.

13. In an instrument of the class described, the combination of a longitudinally extending base having a thin front portion adjacent the bottom plane thereof and having a straight longitudinal guideway at the top, the said guideway comprising two widely spaced front and rear portions, a slide movable along the guideway and having a forward projection located above the said thin portion of the base, the said slide having two widely spaced front and rear portions engaging respectively with the front and rear portions of the guideway, a longitudinally extending coil spring connected at one end with the base and at the opposite end with the said forward projection of the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, a scale plate detachably connected with the base at the top thereon between the said widely spaced portions of the guideway and of the slide, a plurality of longitudinally extending scales on the top of the scale plate, and an indicator connected to and movable with the slide and extending transversely over all of the several scales on the scale plate for registry with the graduations of any of them as the slide is moved to vary the length of the spring.

14. In an instrument of the class described, the combination of a longitudinally extending base having a longitudinal guideway thereon, a slide movable along the guideway, a longitudinally extending coil spring connected at one end with the base and at the opposite end with the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the bottom of the base and near the front thereof, a graph sheet in a fixed position at the top of the base having longitudinally spaced transverse lines which extend in the ordinate direction and having transversely spaced longitudinal lines including front and rear lines which longitudinal lines extend in the abscissa direction which graph sheet is adapted for the marking thereon between said front and rear longitudinal lines of a curve or graph wherein the ordinate distances of points thereon from an abscissa axis conform to a predetermined pattern or formula, and an indicator connected to and movable with the slide and having a transversely extending indicator line movable over the area of the graph sheet which line throughout a portion of its length commensurate with the width between said front and rear longitudinal lines of the graph sheet is adapted to intersect a graph on said sheet and to thereby indicate a value that is a predetermined function of the initial value represented by the amount of spring extension.

15. In an instrument of the class described, the combination of a longitudinally extending base having a longitudinal guideway thereon, a slide movable along the guideway, a longitudinally extending coil spring connected at one end with the base and at the opposite end with the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the bottom of the base and near the front thereof, means for limiting slide movement in one direction to provide a minimum spring length and for limiting slide movement in the opposite direction to provide a maximum spring length, a graph sheet in a fixed position at the top of the base having longitudinally spaced transverse lines which extend in the ordinate direction and having transversely spaced longitudinal lines including front and rear lines which longitudinal lines extent in the abscissa direction which graph sheet is adapted for the marking thereon between the front and rear longitudinal lines of a curve or graph wherein the ordinate distances of points thereon from an abscissa axis conform to a predetermined pattern or formula, and an indicator connected to and movable with the slide and having a transversely extending indicator line movable over the area of the graph sheet which line throughout a portion of its length commensurate with the width between said front and rear longitudinal lines of the graph sheet is adapted to intersect a graph on said sheet and to thereby indicate a value that is a predetermined function of the initial value represented by the amount of spring extension, the said graph sheet having a first transverse line positioned to register with the indicator when the spring has its minimum length and having a last transverse line positioned to register with the indicator when the spring has its maximum length.

16. In an instrument of the class described, the combination of a longitudinally extending base having a longitudinal guideway thereon, a slide movable along the guideway, a longitudinally extending coil spring having its convolutions uniformly spaced longitudinally and shaped to constitute longitudinally aligned graduations, means for connecting the ends of the spring respectively with the base and with the slide so that the said graduations are closely adjacent the bottom of the base and near the front thereof and so that the spacings between all of the graduations are uniformly varied when the spring length is varied by movement of the slide, the said connecting means at the slide end of the spring engaging the said spring at a portion thereof spaced from the last graduation at the said end so that the extent of slide movement is greater than the extent of movement of the said last graduation, means for limiting slide movement in one direction to provide a minimum effective spring length between the end graduations thereof and for limiting slide movement in the opposite direction to provide a maximum effective spring length between the end graduations thereof, a transversely extending indicator connected to and movable with the slide, and a graph sheet at the top of the base having transverse lines in the ordinate direction and longitudinal lines in the abscissa direction which graph sheet is so positioned that the said indicator is movable thereover and is registrable with points thereon as the slide is moved to vary the length of the spring, the said graph sheet having its said transverse lines spaced to compensate for the said greater extent of movement of the slide with a first transverse line positioned to register with the indicator when the spring has its minimum length and with a last transverse line positioned to register with the indicator when the spring has its maximum length.

17. In an instrument of the class described, the combinaton of a longitudinally extending base having a longitudinal guideway thereon, a slide movable along the guideway, a longitudinally extending coil spring connected at one end with the base and at the opposite end with the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the bottom of the base and near the front thereof, an indicator connected to and movable with the slide and having a transversely extending indicator line, a plurality of scales on the top of the base having longitudinally spaced graduations which scales are so positioned that the indicator line of the indicator is registrable with the graduations thereof as the slide is moved to vary the length of the spring, and a graph sheet at the top of the base and at the rear of the scales which graph sheet has longitudinally spaced transverse lines in the ordinate direction and transversely spaced longitudinal lines including front and rear lines which longitudinal lines extend in the abscissa direction, said graph sheet being so positioned that the said indicator line of the indicator is movable thereover and is registrable with points thereon as the slide is moved to vary the length of the spring.

18. In an instrument of the class described, the combination of a longitudinally extending base having a thin front portion adjacent the bottom plane thereof and having a straight longitudinal guideway at the top, the said guideway comprising two widely spaced front and rear portions, a slide movable along the guideway and having a forward projection located above the said thin portion of the base, the said slide having two widely spaced front and rear portions engaging respectively with the front and rear portions of the guideway, a longitudinally extending coil spring connected at one end with the base and at the opposite end with the said forward projection of the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the said thin portion of the base and near the front edge thereof, a plurality of longitudinally extending scales on the top of the base and between the said widely spaced portions of the guideway and of the slide, a graph sheet at the top of the base and at the rear of the scales having transverse lines in the ordinate direction and longitudinal lines in the abscissa direction, and an indicator connected to and movable with the slide and extending transversely over all of the several scales and over the graph sheet, the said indicator being registrable with graduations on the scales and with point on the graph sheet as the slide is moved to vary the length of the spring.

19. In an instrument of the class described, the combination of a longitudinally extending base having a longitudinal guideway thereon, a slide movable along the guideway, a longitudinally extending coil spring connected at one end with the base and at the opposite end with the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the bottom of the base and near the front thereof, and a scale on the base having longitudinally spaced graduations which scale is below the spring and immediately adjacent the graduations thereof so that the scale graduations serve directly to indicate the positions of the spring graduations.

20. In an instrument of the class described, the combination of a longitudinally extending base having a longitudinal guideway thereon, a slide movable along the guideway, a longitudinally extending coil spring connected at one end with the base and at the opposite end with the slide and having its convolutions uniformly spaced longitudinally so that the spacings between all of the convolutions are uniformly varied when the spring length is varied by movement of the slide, the spring being located and shaped to enable the several convolutions thereof to constitute graduations closely adjacent the bottom of the base and near the front thereof, a thin transparent plate on the base below the spring, and a scale on the transparent plate and immediately adjacent the graduations of the spring so that the scale graduations serve directly to indicate the positions of the spring graduations.

References Cited in the file of this patent

UNITED STATES PATENTS

| | | |
|---|---|---|
| 683,379 | Byron | Sept. 24, 1901 |
| 811,625 | Edmonds | Feb. 6, 1906 |
| 1,760,169 | Phelps | May 27, 1930 |
| 1,779,131 | Holness | Oct. 21, 1933 |
| 2,331,298 | Bennett | Oct. 12, 1943 |
| 2,387,404 | Moyer | Oct. 23, 1945 |
| 2,422,649 | Bland | June 17, 1947 |
| 2,422,745 | Ost | June 24, 1947 |
| 2,455,972 | Bowditch | Dec. 14, 1948 |
| 2,517,491 | Jackson | Aug. 1, 1950 |
| 2,530,955 | Gerber | Nov. 21, 1950 |
| 2,561,020 | Gerber | July 17, 1951 |
| 2,572,531 | Steinkoenig | Oct. 23, 1951 |
| 2,634,504 | Jennings | Apr. 14, 1953 |

FOREIGN PATENTS

| | | |
|---|---|---|
| 12,395 | Great Britain | 1894 |
| 225,181 | Switzerland | Apr. 1, 1943 |
| 910,929 | France | Feb. 18, 1946 |
| 912,337 | France | Apr. 23, 1946 |

UNITED STATES PATENT OFFICE
CERTIFICATE OF CORRECTION

Patent No. 2,843,935

July 22, 1958

Heinz Joseph Gerber

It is hereby certified that error appears in the printed specification of the above numbered patent requiring correction and that the said Letters Patent should read as corrected below.

Column 7, line 59, for "flnage" read -- flange --; column 10, line 1, for "marknigs" read -- markings --; column 13, line 62, for "it as" read -- is at --; column 16, line 70, for "thus" read -- this --; column 18, line 43, for the claim reference numeral "3" read -- 5 --; column 21, line 43, for "extent" read -- extend --; column 23, line 1, for "point" read -- points --.

Signed and sealed this 2nd day of December 1958.

(SEAL)
Attest:

KARL H. AXLINE
Attesting Officer

ROBERT C. WATSON
Commissioner of Patents